(12) United States Patent
Kim

(10) Patent No.: US 10,880,456 B2
(45) Date of Patent: *Dec. 29, 2020

(54) IMAGE PICKUP DEVICE AND ELECTRONIC SYSTEM INCLUDING THE SAME

(71) Applicant: SAMSUNG ELECTRONICS CO., LTD., Suwon-si (KR)

(72) Inventor: Duck-Soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/656,258

(22) Filed: Oct. 17, 2019

(65) Prior Publication Data

US 2020/0053254 A1 Feb. 13, 2020

Related U.S. Application Data

(63) Continuation of application No. 16/411,222, filed on May 14, 2019, now Pat. No. 10,511,746, which is a (Continued)

(30) Foreign Application Priority Data

Jul. 26, 2016 (KR) .................. 10-2016-0095081

(51) Int. Cl.
*H04N 5/04* (2006.01)
*H04N 9/73* (2006.01)
(Continued)

(52) U.S. Cl.
CPC ............ *H04N 5/04* (2013.01); *H04N 5/2258* (2013.01); *H04N 5/2351* (2013.01);
(Continued)

(58) Field of Classification Search
CPC .... H04N 5/04; H04N 5/2353; H04N 5/23212; H04N 9/735; H04N 9/09; H04N 5/2258; H04N 5/232127; H04N 9/093
See application file for complete search history.

(56) References Cited

U.S. PATENT DOCUMENTS 4,768,110 A 8/1988 Dunlap et al.
5,216,552 A 6/1993 Dunlap et al.
(Continued)

FOREIGN PATENT DOCUMENTS

JP 2004-037732 2/2004
JP 2008-206090 9/2008
(Continued)

*Primary Examiner* — Timothy J Henn
(74) *Attorney, Agent, or Firm* — Volentine, Whitt & Francos, PLLC

(57) ABSTRACT

An image pickup device includes a first camera, a second camera, a first image signal processor (ISP) and a second ISP. The first camera obtains a first image of an object. The second camera obtains a second image of the object. The first ISP performs a first auto focusing (AF), a first auto white balancing (AWB) and a first auto exposing (AE) for the first camera based on a first region-of-interest (ROI) in the first image, and obtains a first distance between the object and the first camera based on a result of the first AF. The second ISP calculates first disparity information associated with the first and second images based on the first distance, moves a second ROI in the second image based on the first disparity information, and performs a second AF, a second AWB and a second AE for the second camera based on the moved second ROI.

11 Claims, 13 Drawing Sheets

Related U.S. Application Data continuation of application No. 15/658,479, filed on Jul. 25, 2017, now Pat. No. 10,321,021.

(51) Int. Cl.
  *H04N 5/225* (2006.01)
  *H04N 5/232* (2006.01)
  *H04N 5/235* (2006.01)
  *H04N 9/09* (2006.01)
  *H04N 13/243* (2018.01)
  *H04N 13/239* (2018.01)
  *H04N 13/296* (2018.01)

(52) U.S. Cl.
  CPC ....... *H04N 5/2353* (2013.01); *H04N 5/23212* (2013.01); *H04N 5/232061* (2018.08); *H04N 5/232127* (2018.08); *H04N 9/09* (2013.01); *H04N 9/735* (2013.01); *H04N 13/239* (2018.05); *H04N 13/243* (2018.05); *H04N 13/296* (2018.05)

(56) References Cited

U.S. PATENT DOCUMENTS

| | | |
|---|---|---|
| 7,956,886 B2 | 6/2011 | Murayama |
| 8,718,459 B2 | 5/2014 | Hsu |
| 9,247,223 B2 | 1/2016 | McCrackin et al. |
| 10,321,021 B2 | 6/2019 | Kim |
| 2011/0149044 A1 | 6/2011 | Snin |
| 2011/0169921 A1 | 7/2011 | Lee et al. |
| 2012/0033051 A1 | 2/2012 | Atanassov et al. |
| 2012/0242803 A1 | 9/2012 | Tsuda et al. |
| 2012/0327195 A1 | 12/2012 | Cheng |
| 2013/0057655 A1 | 3/2013 | Su et al. |
| 2013/0100311 A1 | 4/2013 | Ogasahara |
| 2013/0250067 A1 | 9/2013 | Laxhuber et al. |
| 2014/0104376 A1 | 4/2014 | Chen |
| 2014/0160245 A1 | 6/2014 | Chen |
| 2015/0092066 A1 | 4/2015 | Geiss et al. |
| 2015/0302031 A1 | 10/2015 | Adelman |
| 2015/0355074 A1 | 12/2015 | Zhou et al. |
| 2016/0088212 A1 | 3/2016 | Narang et al. |
| 2016/0182821 A1 | 6/2016 | Shabtay et al. |
| 2017/0003573 A1 | 1/2017 | Dayana et al. |
| 2017/0011525 A1 | 1/2017 | Kim et al. |
| 2017/0111630 A1 | 4/2017 | Geiss et al. |
| 2017/0150126 A1 | 5/2017 | Kim |

FOREIGN PATENT DOCUMENTS

| | | |
|---|---|---|
| JP | 2009-017457 | 1/2009 |
| JP | 2012-135014 | 7/2012 |

IMAGE PICKUP DEVICE AND ELECTRONIC SYSTEM INCLUDING THE SAME

CROSS-REFERENCE TO RELATED APPLICATION

This is a Continuation of U.S. application Ser. No. 16/411,222, filed May 14, 2019, which is a Continuation of U.S. application Ser. No. 15/658,479, filed Jul. 25, 2017, which issued as U.S. Pat. No. 10,321,021, on Jun. 11, 2019, and in which a claim for priority under 35 U.S.C. § 119 is made to Korean Patent Application No. 10-2016-0095081, filed on Jul. 26, 2016 in the Korean Intellectual Property Office (KIPO), the disclosure of which is incorporated herein in its entirety by reference.

BACKGROUND

The inventive concepts described herein relate generally to image pickup and processing, and more particularly to image pickup devices and electronic systems including the image pickup devices.

Image recording devices (e.g., cameras) have been adopted in various electronic systems and mobile systems such as, for example, computers, mobile phones, tablets, virtual reality (VR) equipment, and robotic systems. Recently, research has focused on dual camera systems including two cameras, and/or multi-camera systems including more than three cameras. Research has further focused on techniques for preventing deterioration of the quality of images obtained by systems including a plurality of cameras.

SUMMARY

Embodiments of the inventive concept are provided to substantially obviate one or more problems due to limitations and disadvantages of the related art.

Embodiments of the inventive concept provide an image pickup device capable of efficiently synchronizing a plurality of cameras with each other.

Embodiments of the inventive concept further provide an electronic system including the image pickup device.

Embodiments of the inventive concept provide an image pickup device including a first camera, a second camera, a first image signal processor (ISP) and a second ISP. The first camera is configured to obtain a first image of an object. The second camera is configured to obtain a second image of the object. The first ISP is configured to perform a first auto focusing (AF), a first auto white balancing (AWB) and a first auto exposing (AE) for the first camera based on a first region-of-interest (ROI) in the first image, and configured to obtain a first distance between the object and the first camera based on a result of the first AF. The second ISP is configured to determine first disparity information associated with the first and second images based on the first distance, configured to move a second ROI in the second image based on the first disparity information, and configured to perform a second AF, a second AWB and a second AE for the second camera based on the moved second ROI.

Embodiments of the inventive concept further provide an electronic system including a processor and an image pickup device controlled by the processor. The image pickup device includes a first camera, a second camera, a first image signal processor (ISP) and a second ISP. The first camera is configured to obtain a first image of an object. The second camera is configured to obtain a second image of the object. The first ISP is configured to perform a first auto focusing (AF), a first auto white balancing (AWB) and a first auto exposing (AE) for the first camera based on a first region-of-interest (ROI) in the first image, and configured to obtain a first distance between the object and the first camera based on a result of the first AF. The second ISP is configured to determine first disparity information associated with the first and second images based on the first distance, configured to move a second ROI in the second image based on the first disparity information, and is configured to perform a second AF, a second AWB and a second AE for the second camera based on the moved second ROI.

Embodiments of the inventive concept still further provide an image pickup device including a plurality of first and second through nth cameras respectively configured to obtain first and second through nth images of an object; and a plurality of first and second through nth image signal processors (ISPs) respectively associated with the first and second through nth cameras, wherein n is an integer greater than 2. The first ISP is configured to perform a first auto focusing (AF), a first auto white balancing (AWB) and a first auto exposing (AE) for the first camera based on a first region-of-interest (ROI) in the first image and to obtain a first distance between the first camera and the object. The second through nth ISPs are configured to respectively move second through nth ROIs of the second through nth images based on the first distance, and to respectively perform AF, AWB and AE for the second through nth cameras based on the moved second through nth ROIs.

In the image pickup device according to embodiments of the inventive concept, AF, AWB and AE for a master camera may be performed based on ROI, and AFs, AWBs and AEs for slave cameras may be performed based on ROIs that are moved by results of the AF, AWB and AE for the master camera, and thus the AFs, AWBs and AEs for all cameras may be efficiently synchronized with each other based on the result of the AF, AWB and AE for the master camera. Accordingly, when a plurality of images obtained by a plurality of cameras in the image pickup device are combined, an image quality of a composite image may not be degraded.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
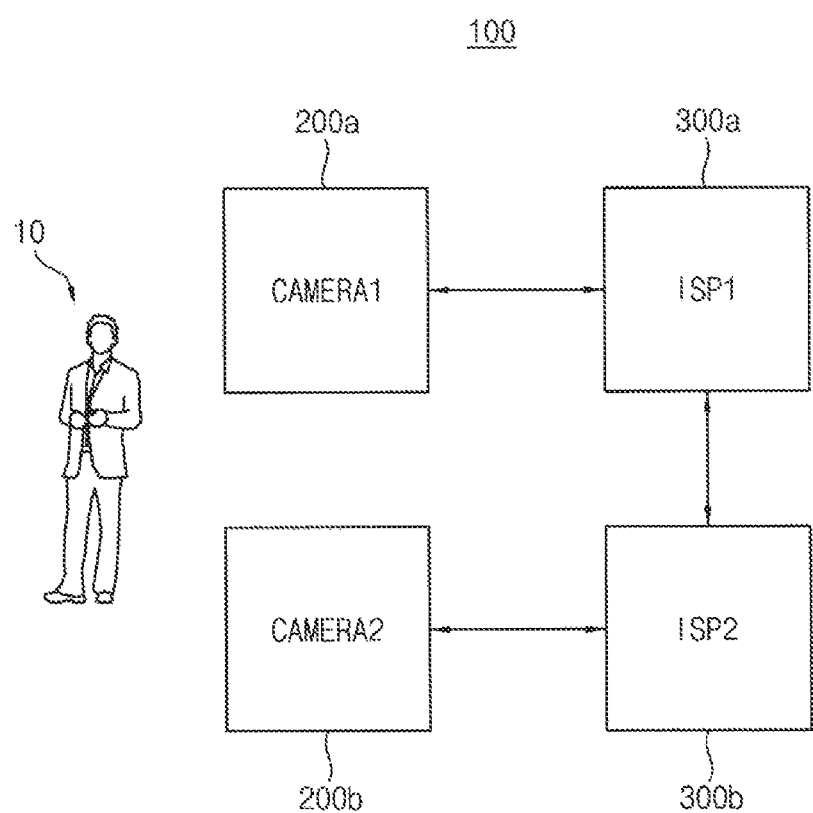
FIG. 1 illustrates a block diagram of an image pickup device according to embodiments of the inventive concept.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

FIG. 1 illustrates a block diagram of an image pickup device according to an embodiment of the inventive concept.

Referring to FIG. 1, an image pickup device 100 includes a first camera (CAMERA1) 200a, a second camera (CAMERA2) 200b, a first image signal processor (ISP1) 300a and a second image signal processor (ISP2) 300b. The first image signal processor 300a and the second image signal processor 300b may hereinafter be referred to as ISPs. Each of the ISPs 300a and 300b in the image pickup device 100 may control a respective one of the cameras 200a and 200b in the image pickup device 100. In other words, in the image pickup device 100, the number of the ISPs may be substantially the same as the number of the cameras.

The first camera 200a obtains a first image of an object 10, and the second camera 200b obtains a second image of the object 10. The second camera 200b may be disposed or arranged adjacent to the first camera 200a. A position and a viewpoint of the second camera 200b may be different from a position and a viewpoint of the first camera 200a, and thus disparity or parallax between the first and second images may exist, as will be described with reference to FIGS. 3 and 4.

In some embodiments of the inventive concept, the first camera 200a may be set as a master camera and the second camera 200b may be set as a slave camera, based on a user setting signal and/or an internal parameter.

The first ISP 300a performs a first auto focusing (or auto focus (AF)), a first auto white balancing (or auto white (color) balance (AWB)) and a first auto exposing (or auto exposure (AE)) for the first camera 200a based on a first region-of-interest (ROI) in the first image. The AF, AWB and AE as performed may collectively be referred to as performing a three-automation (3A).

The second ISP 300b performs a second AF, a second AWB and a second AE for the second camera 200b based on a second ROI in the second image. Before the second AF, the second AWB and the second AE are preformed, a first distance between the object 10 and the first camera 200a is obtained based on a result of the first AF, and first disparity information associated with the first and second images is calculated based on the first distance. For example, the first distance may be obtained by the first ISP 300a, and the first disparity information may be calculated by the second ISP 300b. The second ISP 300b moves a second ROI in the second image based on the first disparity information, and performs the second AF, the second AWB and the second AE for the second camera 200b based on the moved second ROI. Thus, the AFs, AWBs, and AEs for the first and second cameras 200a and 200b may be synchronized with each other. In other words, the 3A for all cameras (e.g., the first and second cameras 200a and 200b) may be synchronized with each other based on a result of the 3A for a master camera (e.g., the first camera 200a).

Figure 2:
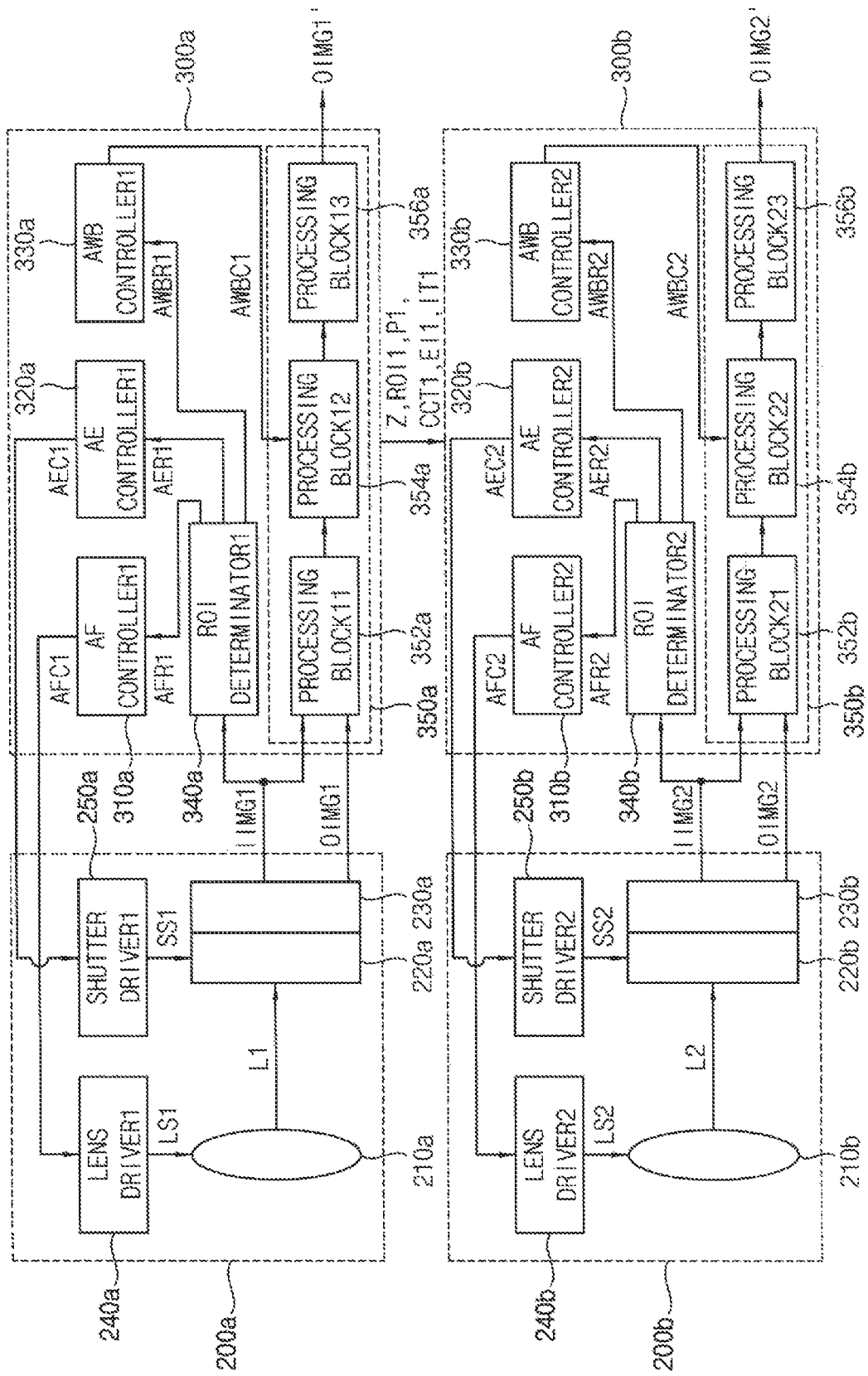
FIG. 2 illustrates a block diagram of cameras and image signal processors included in the image pickup device of FIG. 1.

FIG. 2 illustrates a block diagram of cameras and image signal processors included in the image pickup device of FIG. 1.

Referring to FIG. 2, the first camera 200a includes a first lens 210a, a first shutter 220a, a first sensor 230a, a first lens driver 240a and a first shutter driver 250a.

The first lens 210a may concentrate a first external light signal L1 on the first sensor 230a. For example, the first external light signal L1 may include a visible light signal, an infrared light signal and/or a near-infrared light signal. Although the camera 200a in FIG. 2 includes a single lens 210a, the camera included in the image pickup device may include two lenses or more than two lenses according to other embodiments of the inventive concept.

The first sensor 230a may obtain a first image IIMG1 based on the first external light signal L1. The first image IIMG1 may be an image before the first AF, the first AWB and the first AE are performed. For example, the first image IIMG1 may be an unfocused image that includes blurred or incomplete image information of the object 10.

In some embodiments of the inventive concept, the first sensor 230a may include a complementary metal oxide semiconductor (CMOS) image sensor. For example, the first sensor 230a may include an RGB sensor. In other embodiments of the inventive concept, the first sensor 230a may include one of various types of image sensors, such as a charged coupled device (CCD) image sensor.

The first shutter 220a may selectively provide the first external light signal L1 to the first sensor 230a. For example, the first shutter 220a may include one of an electrical shutter, an optical shutter, a mechanical shutter, or the like.

In some embodiments, the first shutter 220a may be integrated with the first sensor 230a. In other embodiments, the first shutter 220a may be separate from the first sensor 230a.

The first lens driver (LENSDRIVER1) 240a may generate a first lens control signal LS1 for controlling a position of the first lens 210a based on a first AF control signal AFC1. For example, the first lens driver 240a may include one of various types of motors, such as a voice coil motor (VCM). The first shutter driver (SHUTTER DRIVER1) 250a may generate a first shutter control signal SS1 for controlling a switching time of the first shutter 220a (e.g., a time point of opening or closing a shutter) and/or an exposure time of the first shutter 220a (e.g., an integration period of a shutter) based on a first AE control signal AEC1.

The first ISP 300a includes a first AF controller (AF CONTROLLER1) 310a, a first AE controller (AE CONTROLLER1) 320a, a first AWB controller (AWB CONTROLLER1) 330a, a first ROI determinator (ROI DETERMINATOR1) 340a and a first image compensator 350a.

The first ROI determinator 340a may set the first ROI in the first image IIMG1. It is well known that certain spatial and temporal regions or objects in pictures are of more interest/importance to a user than other areas. For example, in video conferencing applications, the viewer may pay more attention to face regions when compared to other regions. In security applications, areas of potential activity (e.g., doors, windows, etc.) may be more important. These more important regions or the regions where the viewer pays more attention to may be referred to as ROIs. The ROI may be referred to as a statistics region.

In some embodiments of the inventive concept, the first ROI may be manually set based on a user's operation. In other embodiments, the first ROI may be automatically set based on predetermined rules or criterions.

In some embodiments, the first ROI may include a first focus ROI for performing the first AF, a first white balance ROI for performing the first AWB, and a first exposure ROI for performing the first AE. In the first image IIMG1, locations and shapes of the first focus ROI, the first white balance ROI and the first exposure ROI may be substantially the same as or different from each other according to embodiments of the inventive concept. The first ROI determinator 340a may generate first focus ROI information AFR1 associated with the first focus ROI, first white balance ROI information AWBR1 associated with the first white balance ROI, and first exposure ROI information AER1 associated with the first exposure ROI.

The first AF controller 310a may generate the first AF control signal AFC1 for the first AF based on the first focus ROI information AFR1. The position of the first lens 210a may be adjusted based on the first AF control signal AFC1 (e.g., based on the first lens control signal LS1 generated using the first AF control signal AFC1). In some embodiments of the inventive concept, the first AF may be performed based on an active scheme which measures a distance to a subject independently of an optical system, and subsequently adjusts the optical system for correct focus. In other embodiments, the first AF may be performed based on a passive scheme which determines correct focus by performing a passive analysis of an image that is entering the optical system. In still other embodiments, the first AF may be performed based on a hybrid scheme which performs both the active scheme and the passive scheme.

The first AE controller 320a may generate the first AE control signal AEC1 for the first AE based on the first exposure ROI information AER1. The operation of the first shutter 220a may be adjusted based on the first AE control signal AEC1 (e.g., based on the first shutter control signal SS1 generated using the first AE control signal AEC1). For example, as will be described with reference to FIG. 12, the first AE may be performed based on an exposure index (EI).

The first AWB controller 330a may generate a first AWB control signal AWBC1 for the first AWB based on the first white balance ROI information AWBR1. For example, as will be described with reference to FIG. 11, the first AWB may be performed based on a correlated color temperature (CCT).

The first image compensator 350a includes a first processing block (PROCESSING BLOCK11) 352a, a second processing block (PROCESSING BLOCK12) 354a and a third processing block 356a (PROCESSING BLOCK13) that perform image compensations and/or corrections. The first processing block 352a may perform de-mosaicing, de-noising and/or sharpening on an image input to the first processing block 352a. The second processing block 354a may perform the first AWB on an image output from the first processing block 352a based on the first AWB control signal AWBC1. The third processing block 356a may perform color correction, color conversion and/or gamma correction on an image output from the second processing block 354a.

The first image compensator 350a may compensate the first image IIMG1, or may compensate a first output image OIMG1 to generate a first compensation image OIMG1'. The first output image OIMG1 may be an image that is obtained by the first camera 200a after the first AF, the first AWB and the first AE are completed. For example, the first output image OIMG1 may be a focused image that includes clear, distinct, vivid or complete image information of the object 10.

The first ISP 300a may provide results of the first AF, the first AWB and the first AE to the second ISP 300b. For example, the first AF controller 310a may obtain a first position P1 (e.g., a finally adjusted position) of the first lens 210a and a first distance Z between the object 10 and the first camera 200a based on a result of the first AF. The first AWB controller 330a may convert a result of the first AWB into a first CCT CCT1. The first AE controller 320a may convert a result of the first AE into a first EI EI1 and may obtain a first exposure time IT1 of the first shutter 220a based on the first AE. The first ROI determinator 340a may generate first ROI information ROI1 including the first focus ROI information AFR1, the first white balance ROI information AWBR1 and the first exposure ROI information AER1. The first distance Z, the first ROI information ROI1, the first position P1, the first CCT CCT1, the first EI EI1 and the first exposure time IT1 may be provided from the first ISP 300a to the second ISP 300b.

In some embodiments of the inventive concept, the first AF, the first AWB and the first AE may be substantially simultaneously or concurrently performed. In other embodiments, the first AF may be performed, and then the first AWB and the first AE may be performed after the first AF is completed.

The second camera 200b includes a second lens 210b, a second shutter 220b, a second sensor 230b, a second lens driver (LENS DRIVER2) 240b and a second shutter driver (SHUTTER DRIVER2) 250b. Each element included in the second camera 200b may be similar to or substantially the same as a respective element included in the first camera 200a. For example, the second lens 210b may concentrate a second external light signal L2 on the second sensor 230b. The second sensor 230b may obtain a second image IIMG2 based on the second external light signal L2. The second image IIMG2 may be an image before the second AF, the second AWB and the second AE are performed. The second shutter 220b may selectively provide the second external light signal L2 to the second sensor 230b. The second lens driver 240b may generate a second lens control signal LS2 for controlling a position of the second lens 210b based on a second AF control signal AFC2. The second shutter driver 250b may generate a second shutter control signal SS2 for controlling a switching time of the second shutter 220b and/or an exposure time of the second shutter 220b based on a second AE control signal AEC2.

The second ISP 300b includes a second AF controller (AF CONTROLLER2) 310b, a second AE controller (AE CONTROLLER2) 320b, a second AWB controller (AWB CONTROLLER2) 330b, a second ROI determinator (ROI DETERMINATOR2) 340b and a second image compensator 350b. Each element included in the second ISP 300b may be similar to or substantially the same as a respective element included in the first ISP 300a.

The second ROI determinator 340b may set the second ROI in the second image IIMG2, may calculate the first disparity information associated with the first and second images IIMG1 and IIMG2 based on the first distance Z, and may move the second ROI in the second image IIMG2 based on the first disparity information. For example, the second ROI in the second image IIMG2 may have an initial location that is substantially the same as the location of the first ROI in the first image IIMG1. For example, the second ROI may be shifted in the second image IIMG2 by a first disparity vector included in the first disparity information.

Similarly to the first ROI, the second ROI may include a second focus ROI for performing the second AF, a second white balance ROI for performing the second AWB, and a second exposure ROI for performing the second AE. The second ROI determinator 340b may move the second focus ROI, the second white balance ROI and the second exposure ROI based on the first disparity information. The second ROI determinator 340b may generate second focus ROI information AFR2 associated with the moved second focus ROI, second white balance ROI information AWBR2 associated with the moved second white balance ROI, and second exposure ROI information AER2 associated with the moved second exposure ROI.

The second AF controller 310b may generate the second AF control signal AFC2 for the second AF based on the second focus ROI information AFR2 and the first position P1 of the first lens 210a. The position of the second lens 210b may be adjusted based on the second AF control signal AFC2 (e.g., based on the second lens control signal LS2 generated using the second AF control signal AFC2). For example, as will be described with reference to FIG. 10, a position of the second lens 210b after the second AF (e.g., a finally adjusted position or a second position) may be within a predetermined range with respect to the first position P1.

The second AE controller 320b may generate the second AE control signal AEC2 for the second AE based on the second exposure ROI information AER2 and the first EI EI1. The operation of the second shutter 220b may be adjusted based on the second AE control signal AEC2 (e.g., based on the second shutter control signal SS2 generated using the second AE control signal AEC2). For example, as will be described with reference to FIG. 12, a second EI corresponding to a result of the second AE may be within a predetermined range with respect to the first EI EI1.

The second AWB controller 330b may generate a second AWB control signal AWBC2 for the second AWB based on the second white balance ROI information AWBR2 and the first CCT CCT1. For example, as will be described with reference to FIG. 11, a second CCT corresponding to a result of the second AWB may be within a predetermined range with respect to the first CCT CCT1.

The second image compensator 350b includes a fourth processing block (PROCESSING BLOCK21) 352b, a fifth processing block (PROCESSING BLOCK22) 354b and a sixth processing block (PROCESSING BLOCK23) 356b that perform image compensations and/or corrections. The fourth processing block 352b may perform de-mosaicing, de-noising and/or sharpening on an image input to the fourth processing block 352b. The fifth processing block 354b may perform the second AWB on an image output from the fourth processing block 352b based on the second AWB control signal AWBC2. The sixth processing block 356b may perform color correction, color conversion and/or gamma correction on an image output from the fifth processing block 354b. The second image compensator 350b may compensate the second image IIMG2, or may compensate a second output image OIMG2 to generate a second compensation image OIMG2'. The second output image OIMG2 may be an image that is obtained by the second camera 200b after the second AF, the second AWB and the second AE are completed.

The second AF, the second AWB and the second AE may be performed after the first AF, the first AWB and the first AE are completed. In some embodiments of the inventive concept, the second AF, the second AWB and the second AE may be substantially simultaneously or concurrently performed. In other embodiments, the second AF may be performed, and then the second AWB and the second AE may be performed after the second AF is completed.

Although not illustrated in FIG. 2, each of the ISPs 300a and 300b may further include a storage block that stores information (e.g., the first distance Z, the first ROI information ROI1, the first position P1, the first CCT CCT1, the first EI EI1, the first exposure time IT1, the second ROI information, the second position, the second CCT, the second EI, etc.) and/or a lookup table that will be described with reference to FIGS. 10 and 12. For example, the storage block may include at least one volatile memory and/or at least one nonvolatile memory.

Figure 3:
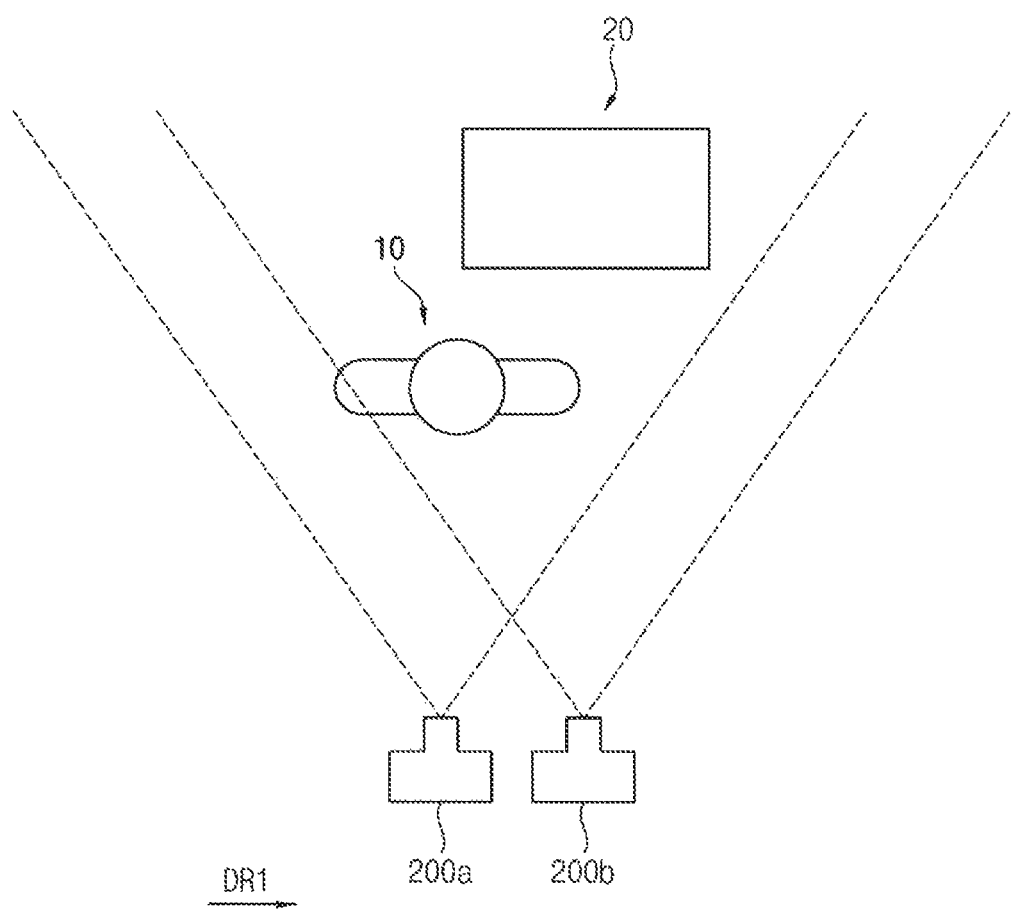
FIG. 3 illustrates a diagram describing an arrangement of cameras according to embodiments of the inventive concept.
Figure 4:
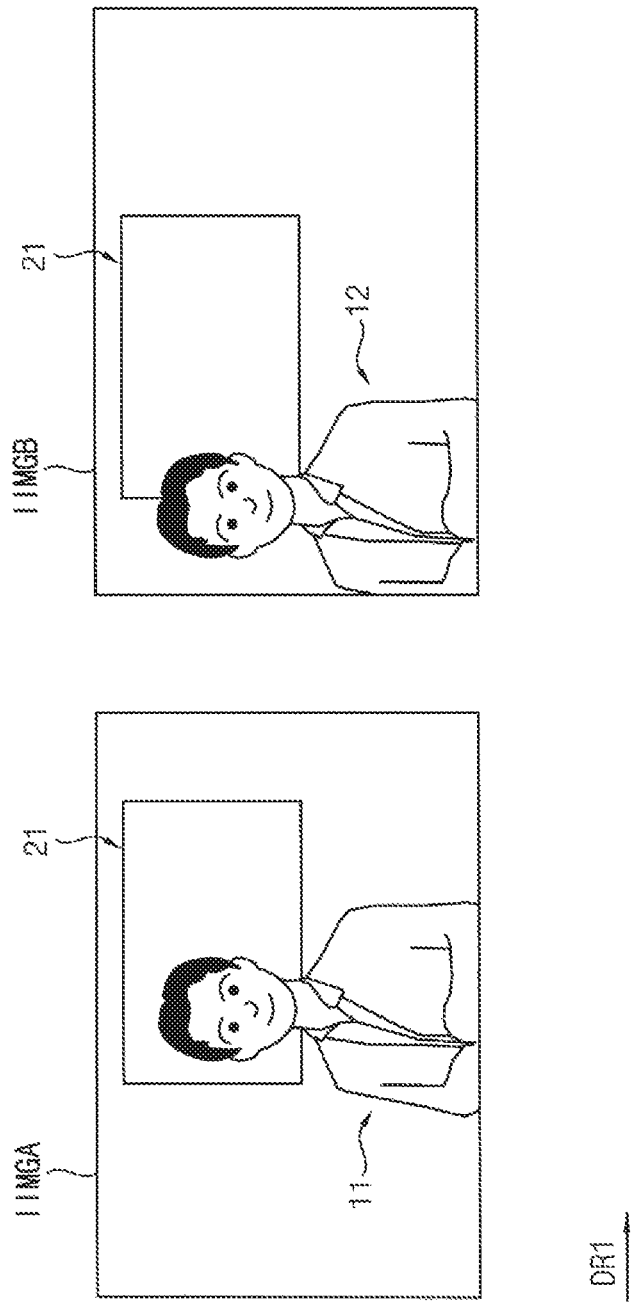
FIG. 4 illustrates a concept of disparity in an image pickup device having an arrangement of cameras such as in FIG. 3.

FIG. 3 illustrates a diagram describing an arrangement of cameras according to embodiments of the inventive concept. FIG. 4 illustrates a concept of disparity in an image pickup device having an arrangement of cameras such as in FIG. 3.

Referring to FIGS. 3 and 4, the first camera 200a and the second camera 200b may photograph an identical scene from different points of view. In FIG. 3, the scene may include a first object 10 and a second object 20. The first object 10 may be a main object or a foreground that is to be captured (e.g., interested by a user), and the second object 20 may be a subsidiary object or a background.

In some embodiments of the inventive concept, the first camera 200a and the second camera 200b may be arranged in parallel with each other in a first direction DR1. For example, in FIG. 3, the first camera 200a may be disposed on the relative left side, and the second camera 200b may be disposed on the relative right side.

A first image IIMGA in FIG. 4 may be photographed by the first camera 200a, and a second image IIMGB in FIG. 4 may be photographed by the second camera 200b.

Since the first image IIMGA and the second image IIMGB are obtained by photographing the identical scene, the first image IIMGA and the second image IIMGB may include identical components. For example, the first object 10 in FIG. 3 may correspond to an object 11 in the first image IIMGA in FIG. 4 and an object 12 in the second image IIMGB in FIG. 4. The second object 20 in FIG. 3 may correspond to an object 21 in the first image IIMGA in FIG. 4 and an object 22 in the second image IIMGB in FIG. 4.

Since the first camera 200a and the second camera 200b have different points of view, the first image IIMGA and the second image IIMGB may include the first object 10 and the second object 20 at different positions. In other words, locations of the objects 11 and 12 in the first and second images IIMGA and IIMGB may be different from each other, and locations of the objects 21 and 22 in the first and second images IIMGA and IIMGB may be different from each other.

As described above, in the images IIMGA and IIMGB including the identical scene, differences between the images IIMGA and IIMGB that are caused by the different points of view of the cameras 200a and 200b may be referred to as disparity or parallax (e.g., binocular disparity or disparity parallax).

Figure 5:
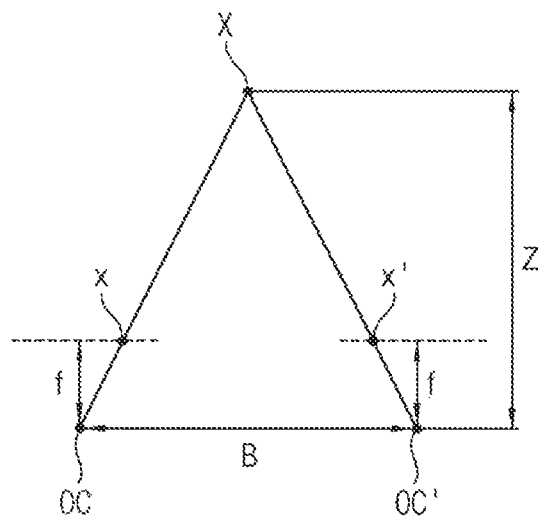
FIG. 5 illustrates a diagram for describing an example of moving a region-of-interest in the image pickup device according to an embodiment of the inventive concept.
Figure 6:
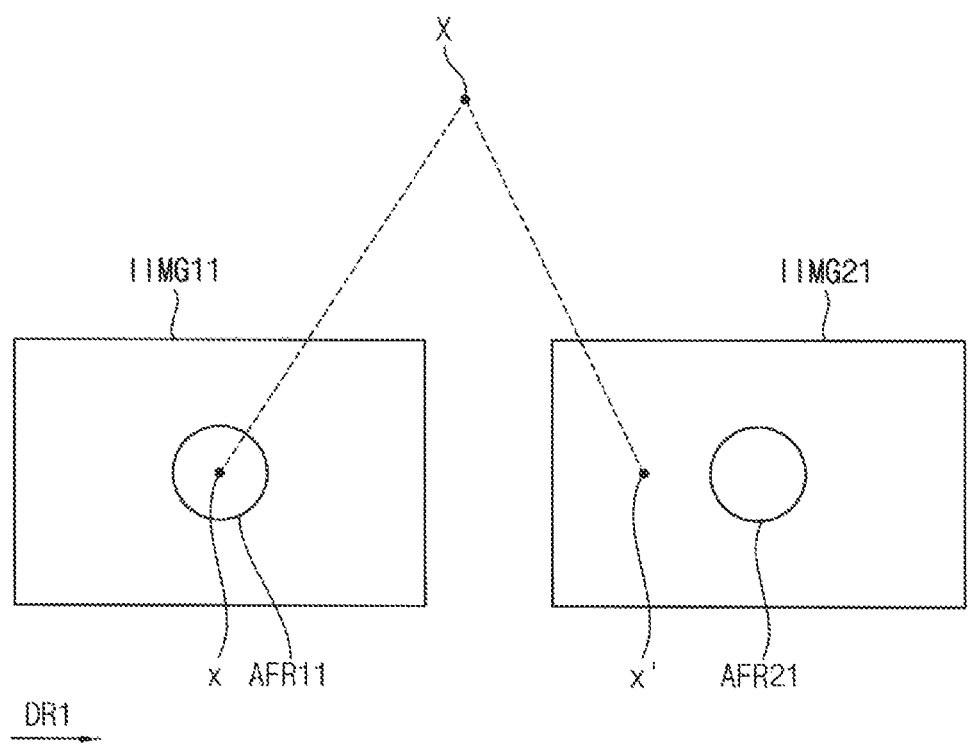
FIG. 6 illustrates another diagram for explaining the example of moving a region-of-interest according to FIG. 5.
Figure 7:
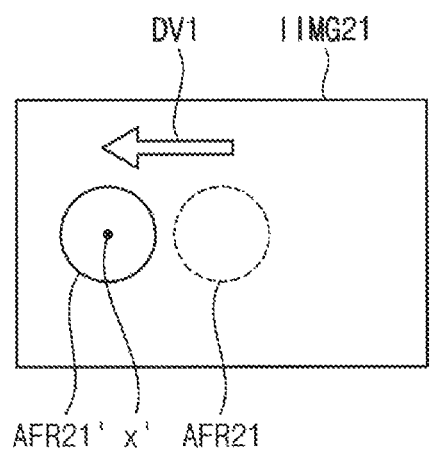
FIG. 7 illustrates another diagram for explaining the example of moving a region-of-interest according to FIG. 5.

FIG. 5 illustrates a diagram for describing an example of moving a region-of-interest in the image pickup device according to embodiments of the inventive concept. FIG. 6 illustrates another diagram for explaining the example of moving a region-of-interest according to FIG. 5. FIG. 7 illustrates another diagram for explaining the example of moving a region-of-interest according to FIG. 5.

FIGS. 5, 6 and 7 illustrate an example where an image rectification is performed on two images IIMG11 and IIMG21 photographed respectively by the first and second cameras 200a and 200b. The image rectification may be a transformation process used to project two-or-more images onto a common image plane. For example, the image rectification may be performed based on epipolar geometry. All rectified images may satisfy the following two properties: (1) all epipolar lines are parallel to the horizontal axis; and (2) corresponding points have identical vertical coordinates.

Referring to FIGS. 1, 5, 6 and 7, a location of the object 10 in real world is denoted by X, a location of the object 10 in the first image IIMG11 obtained by the first camera 200a (e.g., a master camera) is denoted by x, and a location of the object 10 in the second image IIMG21 obtained by the second camera 200b (e.g., a slave camera) is denoted by x'. In FIG. 5, an optical center of the first camera 200a is denoted by OC, an optical center of the second camera 200b is denoted by OC', an effective focal length of the first camera 200a is denoted by f, a length of a baseline is denoted by B, and the first distance between the object 10 and the first camera 200a is denoted by Z.

As illustrated in FIG. 6, to perform AFs for the first and second cameras 200a and 200b, a first focus ROI AFR11 in the first image IIMG11 is set based on a location x of the object 10 in the first image IIMG11, and then the first AF for the first camera 200a is performed based on the first focus ROI AFR11. A second focus ROI AFR21 in the second image IIMG21 has an initial location that is substantially the same as a location of the first focus ROI AFR11 in the first image IIMG11. The second AF for the second camera 200b may not be performed yet based on the second focus ROI AFR21 in FIG. 6 because a location x' of the object 10 in the second image IIMG21 is different from the initial location of the second focus ROI AFR21.

Thus, as illustrated in FIG. 7, the second focus ROI AFR21 is moved in the second image IIMG21 such that moved second focus ROI AFR21' corresponds to the location x' of the object 10 in the second image IIMG21, and then the second AF for the second camera 200b is performed based on the moved second focus ROI AFR21'. Accordingly, the AFs for the first and second cameras 200a and 200b may be efficiently synchronized with each other and may be performed with respect to the locations x and x' of the object 10 in the images IIMG11 and IIMG21, respectively.

In some embodiments of the inventive concept, as illustrated in FIGS. 6 and 7, when the image rectification is performed on the first and second images IIMG11 and IIMG21, the location x' of the object 10 in the second image IIMG21 may be shifted from the location x of the object 10 in the first image IIMG11 in only a first direction DR1. In other words, the first disparity information, which corresponds to a difference between the location x of the object 10 in the first image IIMG11 and the location x' of the object 10 in the second image IIMG21 in FIGS. 6 and 7, may be represented as a one-dimensional (1D) disparity vector DV1 in the rectified images IIMG11 and IIMG21. A magnitude of the 1D disparity vector DV1 in FIG. 7 may be obtained by Equation 1.

$$DV1 = B*f/Z \qquad \text{[Equation 1]}$$

As illustrated in FIG. 7, the moved second focus ROI AFR21' may be obtained by moving the second focus ROI AFR21 by the 1D disparity vector DV1.

Figure 8:
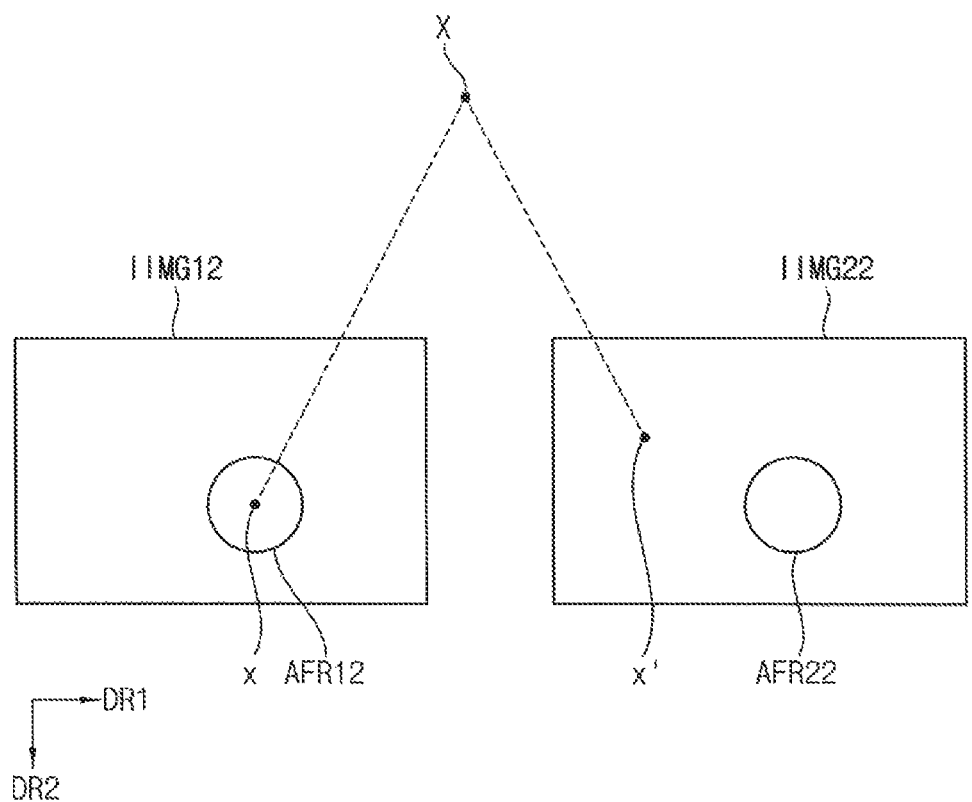
FIG. 8 illustrates a diagram for describing another example of moving a region-of-interest in the image pickup device according to an embodiment of the inventive concept.
Figure 9:
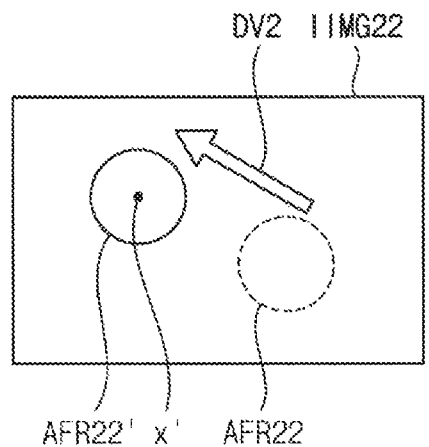
FIG. 9 illustrates a diagram for explaining the another example of moving a region-of-interest according to FIG. 8.

FIG. 8 illustrates a diagram for describing another example of moving a region-of-interest in the image pickup device according to embodiments of the inventive concept. FIG. 9 illustrates a diagram for explaining the another example of moving a region-of-interest according to FIG. 8.

FIGS. 8 and 9 illustrate an example where the image rectification is not performed on two images IIMG12 and IIMG22 respectively photographed by the first and second cameras 200a and 200b.

Referring to FIGS. 1, 8 and 9, the example of FIGS. 8 and 9 may be substantially the same as the example of FIGS. 6 and 7, except that the image rectification is not performed on two images IIMG12 and IIMG22.

As illustrated in FIG. 8, to perform AFs for the first and second cameras 200a and 200b, a first focus ROI AFR12 in the first image IIMG12 is set based on a location x of the object 10 in the first image IIMG12, and then the first AF for the first camera 200a is performed based on the first focus ROI AFR12. As illustrated in FIG. 9, to synchronize the AFs for the first and second cameras 200a and 200b with each other, a second focus ROI AFR22 is moved in the second image IIMG22 such that moved second focus ROI AFR22' corresponds to a location x' of the object 10 in the second image IIMG22, and then the second AF for the second camera 200b is performed based on the moved second focus ROI AFR22'.

In some embodiments of the inventive concept, as illustrated in FIGS. 8 and 9, when the image rectification is not performed on the first and second images IIMG12 and IIMG22, the location x' of the object 10 in the second image IIMG22 may be shifted from the location x of the object 10 in the first image IIMG12 in both the first direction DR1 and a second direction DR2 crossing (e.g., substantially perpendicular to) the first direction DR1. In other words, the first disparity information, which corresponds to a difference between the location x of the object 10 in the first image IIMG12 and the location x' of the object 10 in the second image IIMG22 in FIGS. 8 and 9, may be represented as a two-dimensional (2D) disparity vector DV2 in the non-rectified images IIMG12 and IIMG22. A magnitude of the 2D disparity vector DV2 in FIG. 9 may be obtained by Equations 2, 3 and 4.

$$x=K[I|O]X \quad \text{[Equation 2]}$$

$$x'=K'[R|t]X=K'RK^{-1}x+K't/Z \quad \text{[Equation 3]}$$

$$DV2=x-x' \quad \text{[Equation 4]}$$

In Equations 2, 3 and 4, X indicates a location of the object 10 in real world, x indicates the location of the object 10 in the first image IIMG12 obtained by the first camera 200a (e.g., a master camera), and x' indicates the location of the object 10 in the second image IIMG22 obtained by the second camera 200b (e.g., a slave camera). K indicates an intrinsic matrix of the first camera 200a, K' indicates an intrinsic matrix of the second camera 200b, I indicates a unit matrix, and O indicates a zero matrix. R indicates a relative rotation of the second camera 200b with respect to the first camera 200a, t indicates a relative translation of the second camera 200b with respect to the first camera 200a, and Z indicates the first distance between the object 10 and the first camera 200a. For example, each of K, K', I and R may be a 3*3 matrix, and each of X, x, x', O and t may be a 3*1 matrix.

As illustrated in FIG. 9, the moved second focus ROI AFR22' may be obtained by moving the second focus ROI AFR22 by the 2D disparity vector DV2.

Although FIGS. 5, 6, 7, 8 and 9 illustrate examples in which a focus ROI for AF is only moved, a movement of a white balance ROI for AWB and a movement of an exposure ROI for AE may be substantially the same as the movement of the focus ROI for AF according to embodiments of the inventive concept.

Figure 10:
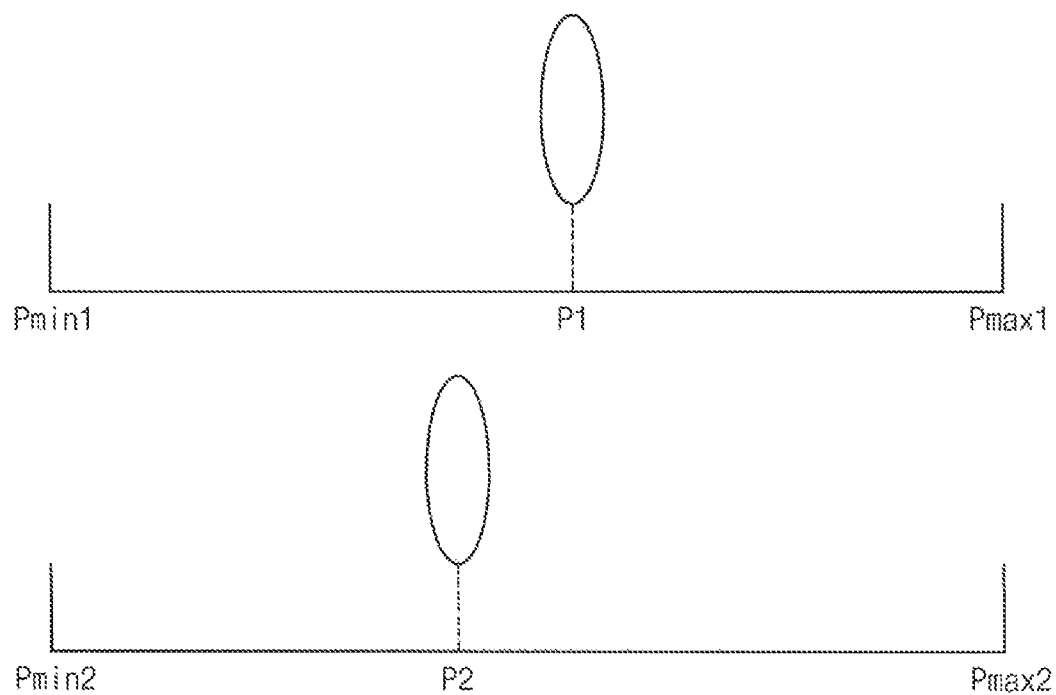
FIG. 10 illustrates a diagram for describing an example of auto focusing in the image pickup device according to an embodiment of the inventive concept.

FIG. 10 illustrates a diagram for describing an example of auto focusing in the image pickup device according to embodiments of the inventive concept.

Referring to FIGS. 1, 2 and 10, the first ISP 300a may determine the first position P1 of the first lens 210a by performing the first AF based on the first focus ROI (e.g., AFR11 in FIG. 6), and may obtain the first distance Z between the object 10 and the first camera 200a based on the first position P1 of the first lens 210a.

In some embodiments of the inventive concept, the first position P1 of the first lens 210a may be any position between a first minimum position Pmin1 closest to the first sensor 230a and a first maximum position Pmax1 farthest from the first sensor 230a.

In some embodiments, the first distance Z may be obtained based on a first lookup table. The first lookup table may include a relationship between all positions on which the first lens 210a can be located (e.g., from the first minimum position Pmin1 to the first maximum position Pmax1) and preset distances between the object 10 and the first camera 200a corresponding to all the positions.

The second ISP 300b may calculate the first disparity information based on the first distance Z, may move the second focus ROI (e.g., AFR21 in FIG. 6) based on the first disparity information, and may determine a second position P2 of the second lens 210b by performing the second AF based on the moved second focus ROI (e.g., AFR21' in FIG. 7) and the first position P1 of the first lens 210a. For example, the first disparity information may be calculated based on Equation 1 or Equations 2, 3 and 4.

In some embodiments, the second position P2 of the second lens 210b may be any position between a second minimum position Pmin2 closest to the second sensor 230b and a second maximum position Pmax2 farthest from the second sensor 230b.

In some embodiments, the second position P2 of the second lens 210b may be within a first predetermined range with respect to the first position P1 of the first lens 210a. In other words, a difference between the first position P1 of the first lens 210a and the second position P2 of the second lens 210b may be smaller than a first threshold value.

In other embodiments of the inventive concept, it may be difficult to directly compare the first position P1 of the first lens 210a with the second position P2 of the second lens 210b. In such an example, the second position P2 of the second lens 210b may be determined by comparing a first focal length with a second focal length. The first focal length may correspond to the first position P1 of the first lens 210a, and the second focal length may correspond to the second position P2 of the second lens 210b. For example, the second focal length may be within a predetermined range with respect to the first focal length.

Figure 11:
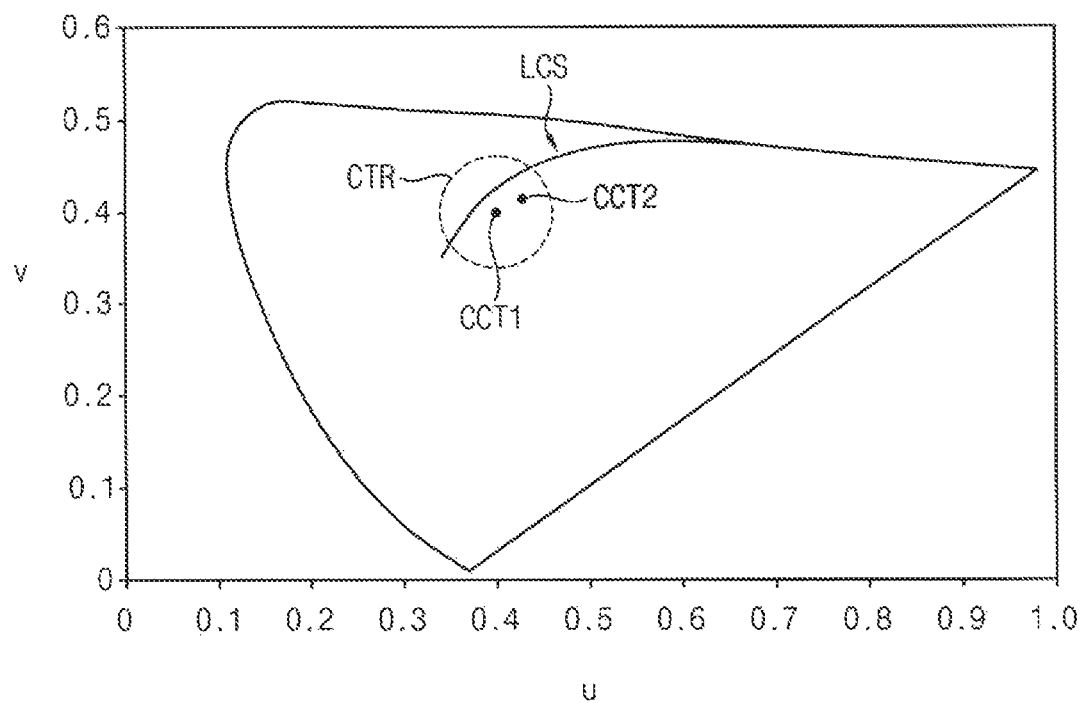
FIG. 11 illustrates a diagram for describing an example of auto white balancing in the image pickup device according to an embodiment of the inventive concept.

FIG. 11 illustrates a diagram for describing an example of auto white balancing in the image pickup device according to embodiments of the inventive concept. FIG. 11 illustrates a graph of a uniform chromaticity space and Planckian locus LCS based on (u,v) chromaticity coordinates.

Referring to FIGS. 1, 2 and 11, the first ISP 300a may perform the first AWB based on the first white balance ROI, and may convert the result of the first AWB into the first CCT1.

The second ISP 300b may calculate the first disparity information based on the first distance Z, may move the second white balance ROI based on the first disparity information, and may perform the second AWB based on the moved second white balance ROI and the first CCT CCT1.

In some embodiments of the inventive concept, a second CCT CCT2 corresponding to the result of the second AWB may be within a second predetermined range CTR with respect to the first CCT CCT1. In other words, a difference between the first CCT CCT1 and the second CCT CCT2 may be smaller than a second threshold value.

In some embodiments, the first CCT CCT1 and the second CCT CCT2 may be adjusted such that at least one of the first CCT CCT1 and the second CCT CCT2 is located corresponding to the Planckian locus LCS (e.g., located on the Planckian locus LCS).

Figure 12:
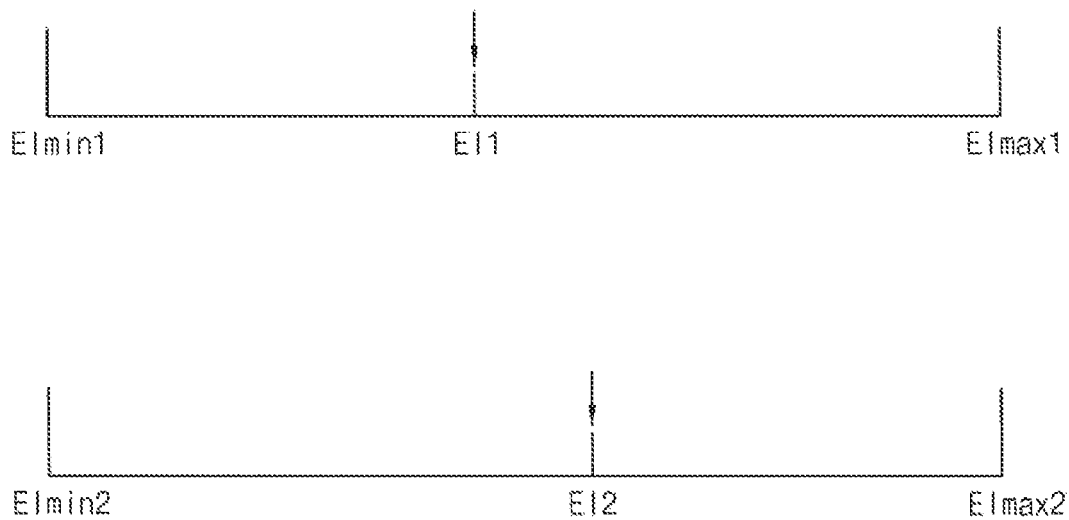
FIG. 12 illustrates a diagram for describing an example of auto exposing in the image pickup device according to an embodiment of the inventive concept.

FIG. 12 illustrates a diagram for describing an example of auto exposing in the image pickup device according to embodiments of the inventive concept.

Referring to FIGS. 1, 2 and 12, the first ISP 300a may perform the first AE based on the first exposure ROI, and may convert the result of the first AE into the first EI EI1. The first ISP 300a may further determine the first exposure time IT1 of the first shutter 220a based on the first AE.

In some embodiments of the inventive concept, the first EI EI1 may be any index between a first minimum index EImin1 and a first maximum index EImax1.

In some embodiments, the first EI EI1 may be obtained based on a second lookup table. The second lookup table may include a relationship between all illuminance values which can be obtained by the first AE and preset indexes corresponding to all the illuminance values.

The second ISP 300b may calculate the first disparity information based on the first distance Z, may move the second exposure ROI based on the first disparity information, and may perform the second AE based on the moved second exposure ROI and the first EI EI1. The second ISP 300b may further determine a second exposure time IT2 of the second shutter 220b based on the second AE and the first exposure time IT1 of the first shutter 220a.

In some embodiments, a second EI EI2 corresponding to the result of the second AE may be any index between a second minimum index EImin2 and a second maximum index EImax2.

In some embodiments, the second EI EI2 may be within a third predetermined range with respect to the first EI EI1. In other words, a difference between the first EI EI1 and the second EI EI2 may be smaller than a third threshold value.

In some embodiments, the first EI EI1 and the second EI EI2 may be adjusted such that a ratio of the first EI EI1 to the second EI EI2 becomes a predetermined ratio.

Although examples where the first distance Z is obtained by the first ISP 300a and the first disparity information is calculated by the second ISP 300b are described with reference to FIGS. 1 through 12, one of the first and second ISPs 300a and 300b may perform both operations of obtaining the first distance Z and calculating the first disparity information according to other embodiments of the inventive concept.

Figure 13:
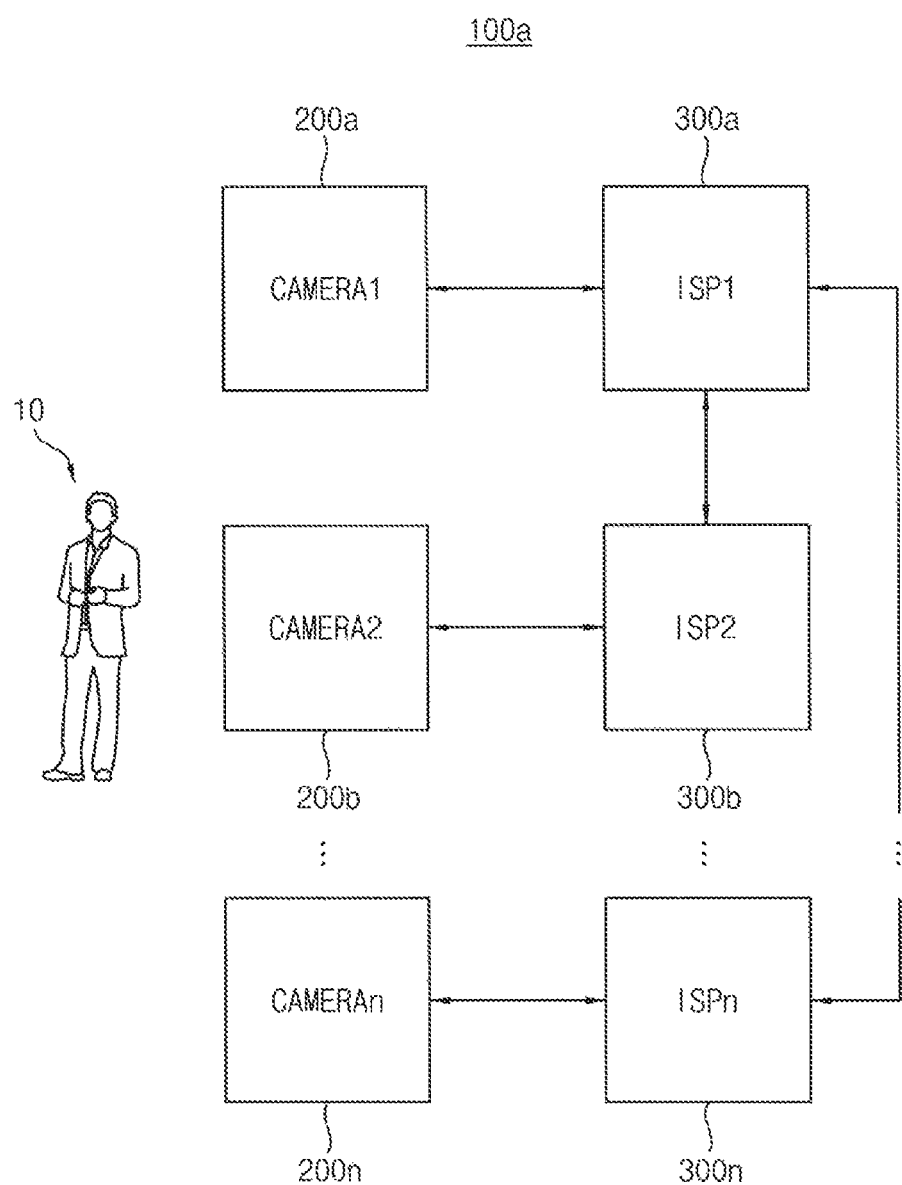
FIG. 13 illustrates a block diagram of an image pickup device according to an embodiment of the inventive concept.

FIG. 13 illustrates a block diagram of an image pickup device according to embodiments of the inventive concept.

Referring to FIG. 13, an image pickup device 100a includes first through n-th cameras 200a, 200b, . . . , 200n (i.e., first and second through nth cameras) and first through n-th ISPs 300a, 300b, . . . , 300n (i.e., first and second through nth ISPs), where n is a natural number equal to or greater than three.

The image pickup device 100a of FIG. 13 may be substantially the same as the image pickup device 100 of FIG. 1, except that the image pickup device 100a of FIG. 13 includes more than two cameras 200a~200n and more than two ISPs 300a~300n.

The first through n-th cameras 200a~200n obtain first through n-th images (i.e., first and second through nth images) of an object 10. For example, the first camera 200a may be set as a master camera, and the second through n-th cameras 200b~200n may be set as slave cameras.

The plurality of cameras 200a~200n may be disposed or arranged in one of various forms. In some embodiments of the inventive concept, the plurality of cameras 200a~200n may be disposed on the same surface of an electronic system (e.g., on a front or back surface of a smart phone) including the image pickup device 100a. In other embodiments, the plurality of cameras 200a~200n may be disposed in an array or matrix form (e.g., arranged in parallel with each other in one direction or in two directions). In still other embodiments, the plurality of cameras 200a~200n may be disposed in a circular form with respect to the object 10.

The first ISP 300a performs a first 3A (e.g., a first AF, a first AWB and the first AE) for the first camera 200a based on a first ROI in the first image. In addition, a first distance between the object 10 and the first camera 200a is obtained based on a result of the first AF, and first through (n–1)-th disparity information associated with the first through n-th images are calculated based on the first distance. The first disparity information is associated with the first and second images, the second disparity information is associated with the first and third images, and the (n–1)-th disparity information is associated with the first and n-th images.

The second ISP 300b moves a second ROI in the second image based on the first disparity information associated with the first and second images, and performs a second 3A (e.g., a second AF, a second AWB and a second AE) for the second camera 200b based on the moved second ROI. The n-th ISP 300n moves an n-th ROI in the n-th image based on the (n–1)-th disparity information associated with the first and n-th images, and performs an n-th 3A (e.g., an n-th AF, an n-th AWB and an n-th AE) for the n-th camera 200b based on the moved n-th ROI. The 3A for all cameras 200a~200n may be synchronized with each other based on a result of the 3A for the master camera (e.g., the first camera 200a).

In some embodiments of the inventive concept, configurations and operations of the first and second cameras 200a and 200b and the first and second ISPs 300a and 300b may be substantially the same as the examples described with reference to FIGS. 2 through 12. Cameras (e.g., the n-th camera 200n) other than the first and second cameras 200a and 200b may be substantially the same as the second camera 200b, and ISPs (e.g., the n-th ISP 300n) other than the first and second ISPs 300a and 300b may be substantially the same as the second ISP 300b.

In some embodiments, at least a part of the ISPs 300a~300n in FIGS. 1 and 13 may be implemented as hardware. In other embodiments, at least a part of the ISPs 300a~300n in FIGS. 1 and 13 may be implemented as instructions or program routines (e.g., a software program) that are executed by a processor and are stored in a storage.

In some embodiments, the ISPs 300a~300n in FIGS. 1 and 13 may be implemented as separate chipsets or separate integrated circuits. In other embodiments, at least two of the ISPs 300a~300n in FIGS. 1 and 13 may be implemented as one chipset.

Although embodiments where the first camera 200a is set as a master camera are described with reference to FIGS. 1 through 13, the master camera may be changed based on a user setting signal and/or an internal parameter according to other embodiments of the inventive concept.

Figure 14:
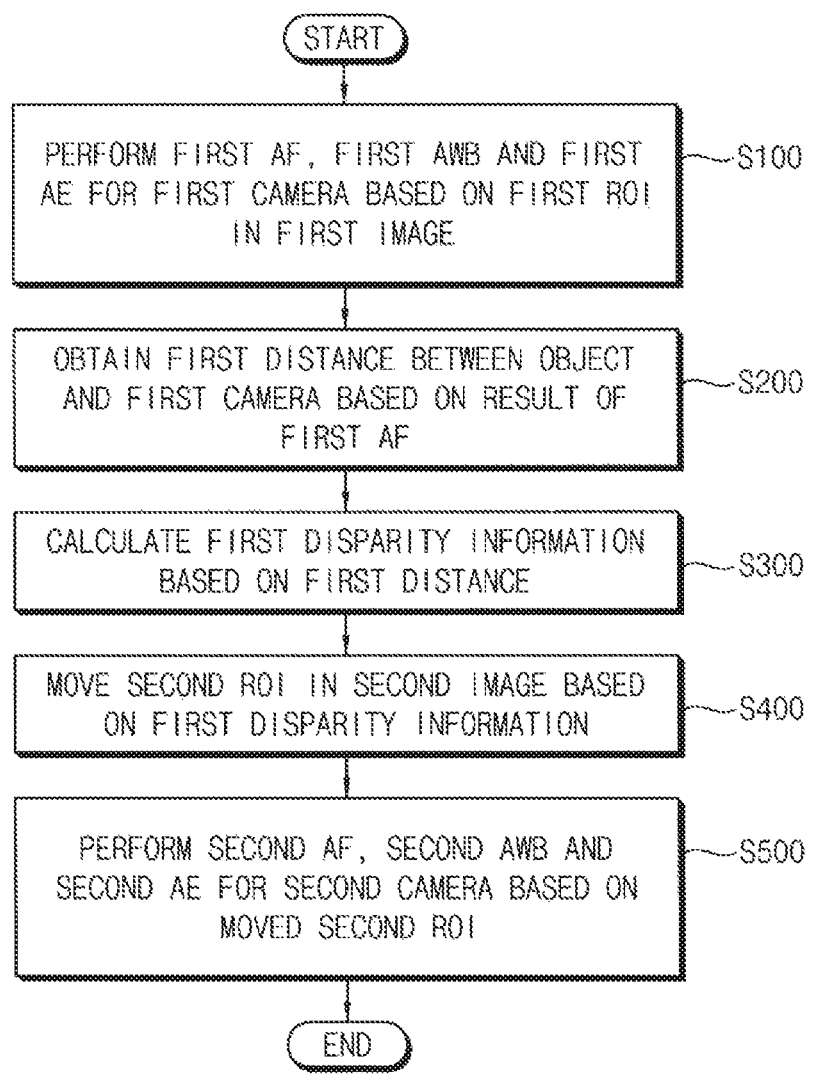
FIG. 14 illustrates a flow chart of a method of operating an image pickup device according to an embodiment of the inventive concept.

FIG. 14 illustrates a flow chart of a method of operating an image pickup device according to embodiments of the inventive concept.

Referring to FIGS. 1, 2 and 14, in a method of operating the image pickup device 100 according to embodiments of the inventive concept, a first AF, a first AWB and a first AE for the first camera 200a are performed based on a first ROI in the first image IIMG1 (step S100). The first image IIMG1 is an image of the object 10 and is obtained by the first camera 200a.

The first distance Z between the object 10 and the first camera 200a is obtained based on a result of the first AF (step S200). First disparity information is calculated based on the first distance Z (step S300). The first disparity information is associated with the first and second images IIMG1 and IIMG2. For example, the first disparity information may represent differences between the first and second images IIMG1 and IIMG2 that are caused by different points of view of the cameras 200a and 200b.

A second ROI in the second image IIMG2 is moved based on the first disparity information (step S400). A second AF, a second AWB and a second AE for the second camera 200b are performed based on the moved second ROI (step S500).

As described with reference to FIGS. 1 and 2, step S100 may be performed by the first ISP 300a, and steps S400 and S500 may be performed by the second ISP 300b. Although in some embodiments of the inventive concept step S200 is performed by the first ISP 300a and step S300 is performed by the second ISP 300b, in other embodiments both steps S200 and S300 may be performed by one of the first and second ISPs 300a and 300b.

Figure 15:
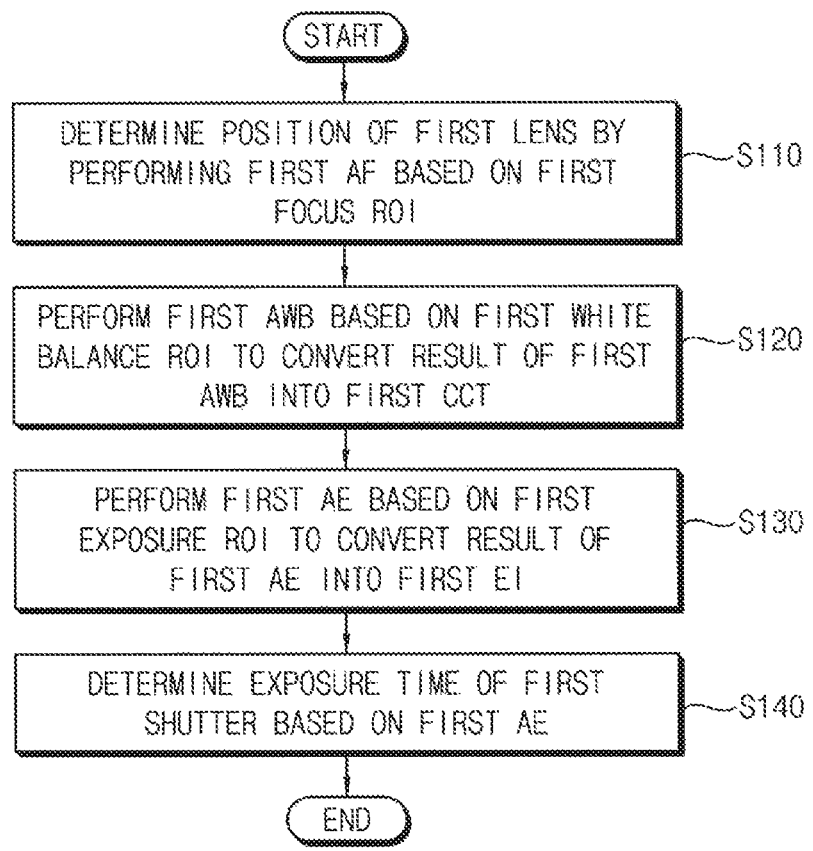
FIG. 15 illustrates a flow chart of an example of step S100 in FIG. 14.

FIG. 15 illustrates a flow chart of an example of step S100 in FIG. 14. Step S100 may be performed by first ISP 300a.

Referring to FIGS. 1, 2, 14 and 15, in the step of performing a first 3A including the first AF, the first AWB and the first AE (step S100), a position of the first lens 210a may be determined by performing the first AF based on a first focus ROI included in the first ROI (step S110). In step S200 in FIG. 14, the first distance Z may be obtained based on the position of the first lens 210a.

Returning to FIG. 15, the first AWB may be performed based on a first white balance ROI included in the first ROI to convert a result of the first AWB into the first CCT CCT1 (step S120). The first AE may be performed based on a first exposure ROI included in the first ROI to convert a result of the first AE into the first EI EI1 (step S130).

An exposure time of the first shutter 220a may be determined based on the first AE (step S140).

Figure 16:
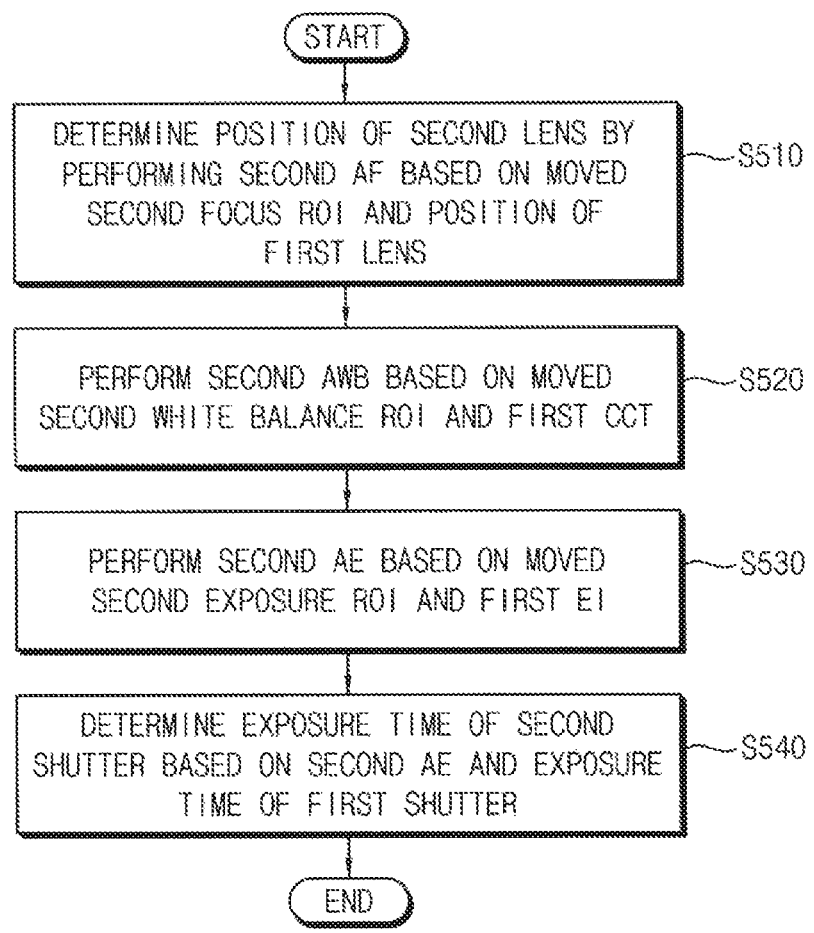
FIG. 16 illustrates a flow chart of an example of step S500 in FIG. 14.

FIG. 16 illustrates a flow chart of an example of step S500 in FIG. 15. Step S500 may be performed by second ISP 300b.

Referring to FIGS. 1, 2, 14 and 16, in step S400 before step S500, a second focus ROI, a second white balance ROI and a second exposure ROI included in the second ROI may be moved based on the first disparity information.

Returning to FIG. 16, in the step of performing a second 3A including the second AF, the second AWB and the second AE (step S500), a position of the second lens 210b may be determined by performing the second AF based on the moved second focus ROI and the position of the first lens 210a (step S510). For example, a difference between the position of the first lens 210a and the position of the second lens 210b may be smaller than a first threshold value.

The second AWB may be performed based on the moved second white balance ROI and the first CCT CCT1 (step S520). For example, a difference between the first CCT CCT1 and a second CCT corresponding to a result of the second AWB may be smaller than a second threshold value.

The second AE may be performed based on the moved second exposure ROI and the first EI EI1 (step S530). For example, a difference between the first EI EI1 and a second EI corresponding to a result of the second AE may be smaller than a third threshold value.

An exposure time of the second shutter 220b may be determined based on the second AE and the exposure time of the first shutter 220a (step S540).

As will be appreciated by those skilled in the art, the present disclosure may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device. For example, the computer readable medium may be a non-transitory computer readable medium.

Figure 17:
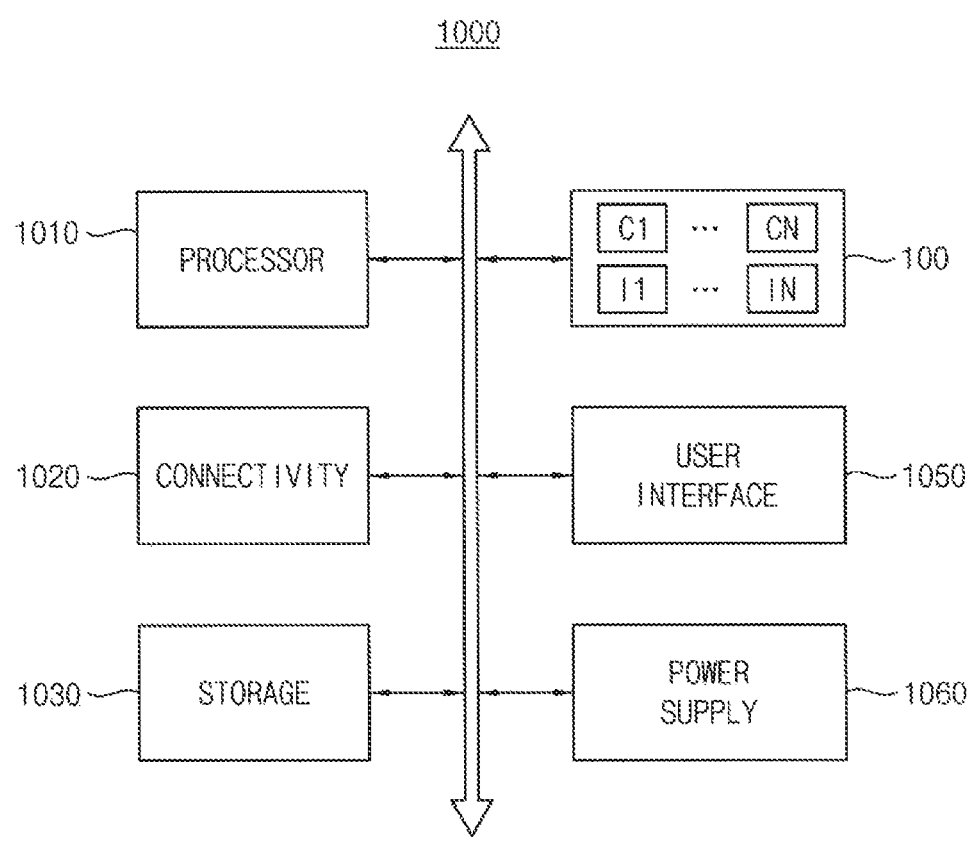
FIG. 17 illustrates a block diagram of an electronic system according to an embodiment of the inventive concept.

FIG. 17 illustrates a block diagram of an electronic system according to embodiments of the inventive concept.

Referring to FIG. 17, an electronic system 1000 includes a processor 1010 and an image pickup device 100. The electronic system 1000 may further include a connectivity module or device 1020, a storage device 1030, a user interface 1050 and a power supply 1060.

The processor 1010 controls overall operations of the electronic system 1000. The image pickup device 100 includes a plurality of cameras C1 . . . , CN and a plurality of ISPs I1, . . . , IN, and may be implemented according to the various embodiments described with respect to FIGS. 1-16. In the image pickup device 100, AF, AWB and AE for a master camera may be performed based on ROI in an image taken by the master camera, AFs, AWBs and AEs for slave cameras may be performed based on ROIs in images taken by the slave cameras that are moved by results of the AF, AWB and AE for the master camera, and thus the AFs, AWBs and AEs for all cameras may be synchronized with each other based on the result of the AF, AWB and AE for the master camera.

In some embodiments of the inventive concept, the processor 1010 may generate a composite image by combining images (e.g., OIMG1' and OIMG2' in FIG. 2) that are obtained after the AFs, AWBs and AEs for all cameras are completed. In some embodiments, at least one of the ISPs I1, . . . , IN may be included in the processor 1010.

The connectivity module 1020 may communicate with an external device (not shown). The storage device 1030 may operate as a data storage for data processed by the processor 1010 or a working memory in the electronic system 1000. The user interface 1050 may include at least one input device such as, for example, a keypad, a button, a microphone, a touch screen, or the like, and/or at least one output device such as, for example, a speaker, a display device, or the like. The power supply 1060 may provide power to the electronic system 1000.

The embodiments of the inventive concept may be applied to various devices and systems that include an image pickup device having a plurality of cameras. For example, the embodiments of the inventive concept may be applied to systems such as be mobile phones, smart phones, tablet computers, laptop computers, personal digital assistants (PDAs), portable multimedia players (PMPs), digital cameras, portable game consoles, wearable systems, internet of things (IoT) systems, three-dimensional (3D) geometry reconstruction systems, array camera systems, virtual reality (VR) systems, augmented reality (AR) systems, or the like.

The foregoing is illustrative of example embodiments and should not be construed as limiting thereof. Although a few example embodiments have been described, those skilled in the art will readily appreciate that many modifications of the embodiments are possible without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications of the disclosed example embodiments, as well as other example embodiments, are intended to be included within the scope of the appended claims.

What is claimed is:

1. An image pickup device comprising:
   a first camera configured to generate a first image;
   a second camera configured to generate a second image; and
   an image signal processor (ISP) configured to:
   perform a first auto exposure (AE) for the first camera,
   determine disparity information associated with the first image and the second image based on a distance between an object and the first camera,
   move a region of interest (ROI) in the second image based on the disparity information, and
   perform a second AE for the second camera based on the moved ROI.

2. The image pickup device of claim 1, wherein the first camera and the second camera are sequentially arranged along a same direction.

3. The image pickup device of claim 2, wherein the ISP performs a first auto focusing (AF) for the first camera and determines the distance based on a result of the first AF.

4. The image pickup device of claim 3, wherein the first camera comprises a first lens and a first sensor and is configured to move the first lens for the first AF.

5. The image pickup device of claim 4, wherein the first camera is a master camera and the second camera is a slave camera based on a user setting signal.

6. The image pickup device of claim 5, wherein the first camera has two or more lenses.

7. The image pickup device of claim 6, wherein the first camera further comprises a first lens driver, and
   wherein the first lens driver is configured to move the first lens for the first AF.

8. The image pickup device of claim 7, wherein the first lens driver is a voice coil motor.

9. The image pickup device of claim 4, wherein the second camera comprises a second lens and a second sensor and is configured to move the second lens for a second AF.

10. The image pickup device of claim 9, wherein the second camera further comprises a second lens driver, and
    wherein the second lens driver is configured to move the second lens for the second AF.

11. The image pickup device of claim 2, wherein the ISP performs an auto white balancing (AWB) for the second camera based on the moved ROI.

* * * * *